Figure 7:
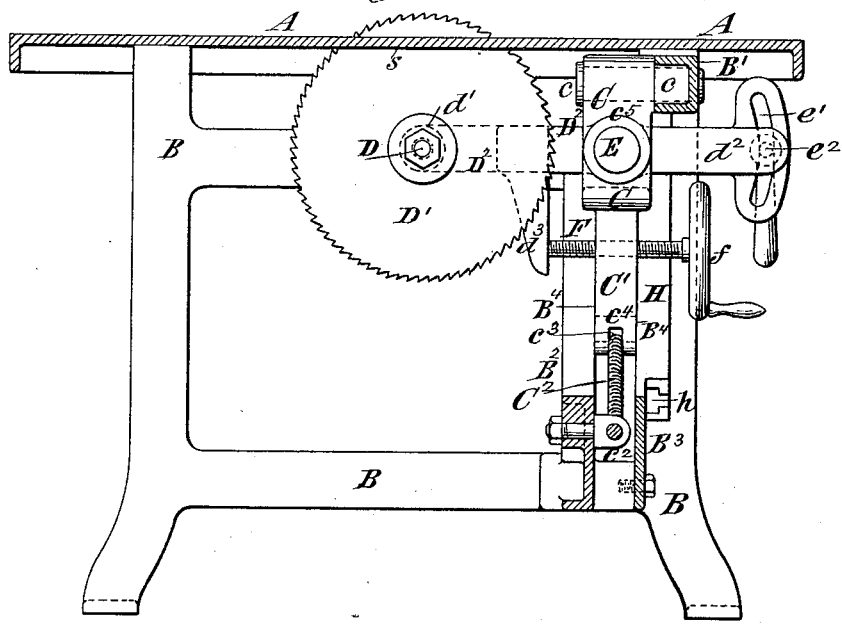

(No Model.)  2 Sheets—Sheet 1.
E. D. MACKINTOSH.
CIRCULAR SAWING MACHINE.
No. 366,633. Patented July 12, 1887.
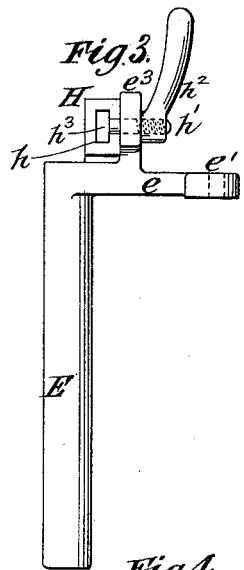
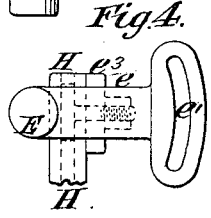
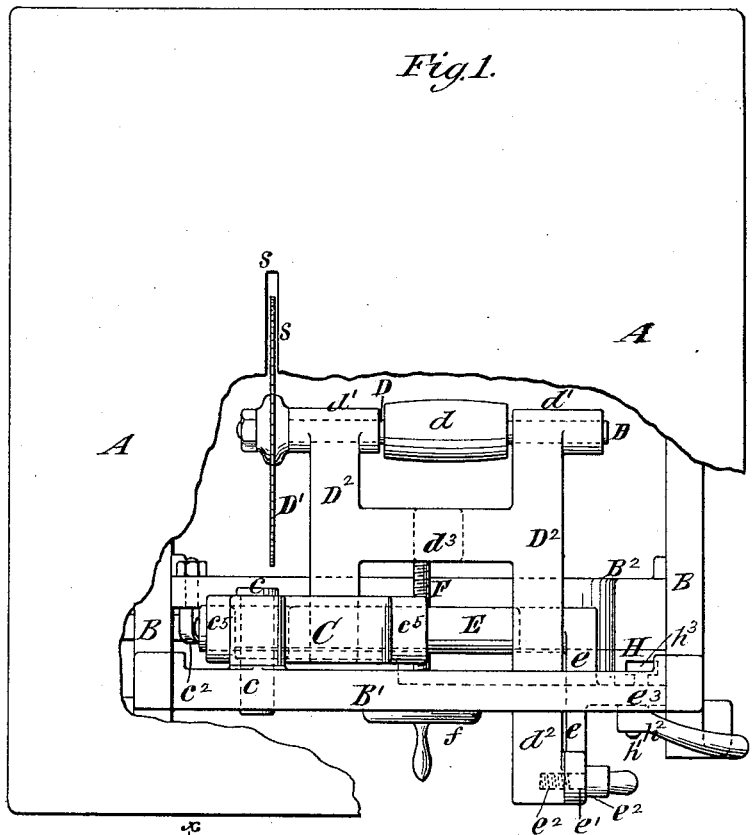
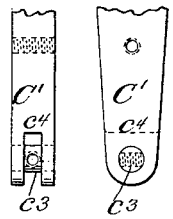
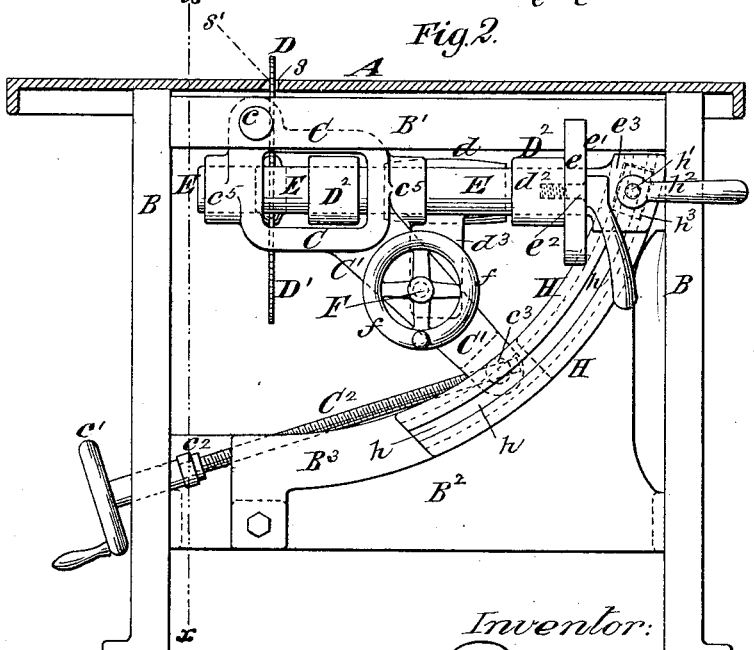
Witnesses:
Emil Herter
C. Sundgren
Inventor:
Edward D. Mackintosh
by his attys
Brown & Hall
N. PETERS, Photo-Lithographer, Washington, D. C.

(No Model.) 2 Sheets—Sheet 2.

E. D. MACKINTOSH.
CIRCULAR SAWING MACHINE.

No. 366,633. Patented July 12, 1887.

Witnesses:
Emil Herter
C. E. Lundgren

Inventor:
Edward D. Mackintosh
by his Att'ys
Brown & Hall

N. PETERS, Photo-Lithographer, Washington, D. C.

UNITED STATES PATENT OFFICE.

EDWARD D. MACKINTOSH, OF BROOKLYN, ASSIGNOR TO PAUL PRYIBIL, OF NEW YORK, N. Y.

CIRCULAR SAWING MACHINE.

SPECIFICATION forming part of Letters Patent No. 366,633, dated July 12, 1887.

Application filed November 17, 1886. Serial No. 219,145. (No model.)

*To all whom it may concern:*

Be it known that I, EDWARD D. MACKINTOSH, of Brooklyn, in the county of Kings and State of New York, have invented a new and useful Improvement in Circular-Saw Tables, of which the following is a specification.

My invention relates, in general, to that class of circular-saw tables in which the saw-arbor is so supported that it may be swung downward in a vertical plane, and at that end which is most distant from the saw, in order to cant or tilt the saw at any desired angle relatively to the surface of the table, or, as it is commonly termed, to "angle" the saw; and the invention particularly applies to saw-tables of the character above described, in which the center or centers upon which the arbor is swung downward at an angle are arranged below the table-top or table proper, which provides for forming such center or centers in the simplest possible manner.

It is obvious that where the center on which the arbor is swung downward at an angle relatively to the surface of the table is arranged beneath the surface of the table that the movement of the arbor to angle the saw will produce a considerable side movement of the saw, which will necessitate a wide slot in the table, unless such side movement be counteracted.

The object of my invention is to provide means whereby the side movement of the saw in its slot, which results from the arrangement of the center on which the arbor swings downward at an angle below the surface of the table, will be counteracted or compensated for by the endwise movement of the arbor, so that but a narrow slot in the table will be necessitated.

In what I now consider a preferable arrangement of parts for carrying out my invention, I provide in front of the saw a hanger, which is pivoted below the surface of the saw-table, or which has its center of movement below the surface of said table, and in this hanger, and approximately parallel with the saw-arbor, is a non-rotary bar which is capable of a sliding movement through the hanger in the direction of its length. On the said bar is journaled a frame, which at its free end comprises the bearings for the saw-arbor, and both the bar and the said frame have arms, which project from the bar in an opposite direction to the frame, and which are capable of adjustment one relatively to the other, and provided with a clamping device for securing the frame immovably upon the bar after adjustment. By this adjustable connection of the arbor-carrying frame with the non-rotary bar provision is afforded for raising and lowering the saw to give it any desired degree of protrusion above the table. The aforesaid hanger has a downwardly-extending arm, which is acted upon by a screw mounted in a swiveled bearing, and engaging a swiveled nut, in order to swing the said hanger in an approximately vertical plane parallel with the saw-arbor, and thus angle the saw. I also provide in the said hanger or its downwardly-projecting arm a screw, which bears against a downward projection on the arbor-carrying frame and serves as a means of swinging said frame upon the non-rotary bar when the clamping device which connects said frame and bar is slackened.

In order to produce the endwise movement of the saw-arbor as it is swung down in a vertical plane to angle the saw, I provide a segmental slideway or track which has its center, or which is struck from a center, eccentric to the pivot on which the hanger swings, and the non-rotary bar has a slide which bears against this slideway or track, and through which, when the hanger is swung downward, as described, the non-rotary bar supporting the arbor-carrying frame is slid endwise and upward, so as to produce the sliding or endwise movement of the saw-arbor, which is necessary to counteract or compensate for the side movement of the saw in its slot.

The invention consists in novel combinations of parts, which are above briefly referred to, and which are hereinafter particularly described, and pointed out in the claims.

Figure 8:
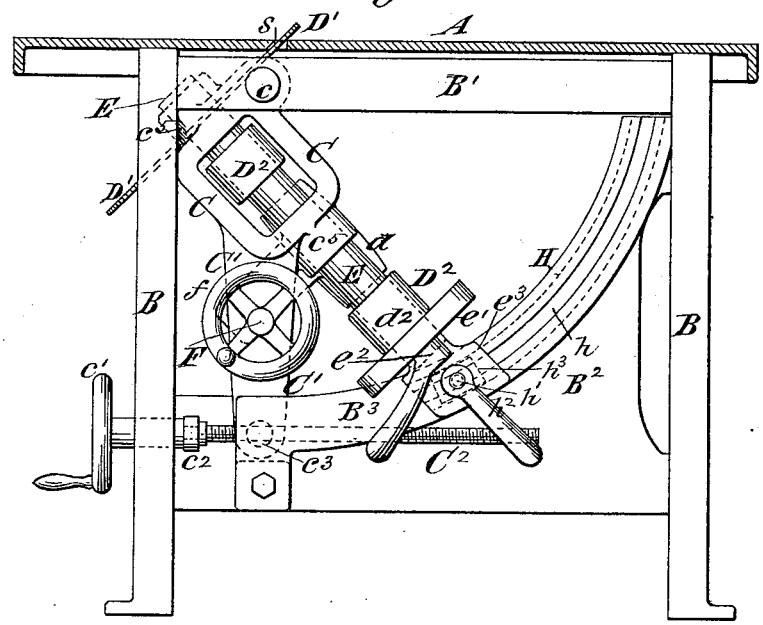

In the accompanying drawings, Figure 1 is a plan of a saw-table embodying my invention, a portion of the table-top or table proper being broken away to show the arrangement of the parts beneath. Fig. 2 is a front view of the machine, the table-top only being shown in section and the saw being adjusted to its normal position, so as to rotate in a vertical plane. Fig. 3 is a plan of the non-rotary bar, whereby the arbor-carrying frame is supported, and including an end view of the segmental or arc-shaped cam with which a slide upon the bar engages, and the clamping device, whereby the bar may be secured or clamped to the cam at any desired angle in a vertical plane. Fig. 4 is an end view of the parts shown in Fig. 3. Figs. 5 and 6 are elevations at right angles to each other, showing a portion of the downwardly-extending arm, which is provided upon the hanger, and the swiveled nut provided in said arm. Fig. 7 is a sectional elevation upon the plane of the dotted line $x\ x$, Fig. 2; and Fig. 8 is an elevation similar to Fig. 2, showing the arbor as swung downward to nearly its full limit in order to angle the saw relatively to the table-top or table proper.

Similar letters of reference designate corresponding parts in all the figures.

A designates the table-top or table proper, which is usually made of metal, and B designates the upright side portions of the frame, which are connected at the front immediately below the table by a girt, B', and which are furthermore connected by two other girts or upright cross-frames, $B^2\ B^3$, forming between them a channel-way or opening, $B^4$, having parallel sides, as shown in Fig. 7.

C designates a hanger or frame, which may be of cast metal, and which is pivoted or supported by a pin, $c$, in the upper girt, B'. The pin or pivot $c$ is arranged beneath the table-top or table proper, A, and upon the pin as a center the hanger C may be swung downward from the position shown in Fig. 2 to the position shown in Fig. 8, or to any intermediate position between these two extremes.

I have here represented the hanger C as furnished with a downwardly-extending arm, C', and $C^2$ designates a screw provided with a hand-wheel, $c'$, for turning it, and by which the hanger C may be swung to any desired position in an approximately vertical plane which is parallel with the saw-arbor D. As here represented, the screw $C^2$ is journaled in the swiveled bearing $c^2$, and engages a swiveled nut, $c^3$, in the end of the downwardly-projecting arm C'. The arm C' moves in the parallel-sided channel or slideway $B^4$, which is formed between the two girts or frames $B^2\ B^3$, as is best shown in Fig. 7, and the said arm is forked, as shown at $c^4$, in order to receive the screw $c^2$ through the nut $c^3$.

The nut $c^3$ may consist simply of a round plug or piece fitted to turn in the arm C', and this nut is held in place endwise both by the screw $C^2$, which passes through it, and by the sides of the channel or slideway $B^4$, in which the arm moves. This channel or slideway, receiving the arms, serves to steady the hanger C in whatever position it may be adjusted, and renders any pivotal supports other than that of the simple pin, $c$, unnecessary.

The arbor D has a pulley, $d$, for receiving a driving-belt, and upon the arbor is secured the saw D', which works through a narrow slot, $s$, in the table-top or table proper, A. The arbor D is journaled in bearings $d'$ in the arbor-carrying frame $D^2$, and said arbor-carrying frame is journaled upon and supported directly by a non-rotary bar, E, which is fitted to bearings $e^5$ in the hanger C, and is capable of sliding lengthwise in said bearings.

The bar E has at its end a forwardly-extending arm, $e$, and in close proximity thereto the arbor-carrying frame $D^2$ is provided with an arm, $d^2$, which extends forward on the opposite side of the bar E from that on which the arbor D is located.

Through the downwardly extending arm C' of the hanger C is passed an adjusting-screw, F, which fits a nut in said arm, and which may be turned by a hand-wheel, $f$, at the front of the machine. The end of this screw bears against a downward projection, $d^3$, upon the arbor-carrying frame $D^2$, and inasmuch as the bar E is prevented from turning by means hereinafter described it will be obvious that the operation of the screw F will raise or lower the arbor-carrying frame, swinging it upon the bar E as a center, in order to raise or lower the saw D' and obtain any desired protrusion of the saw above the table-top A.

In order to firmly hold the arbor-carrying frame $D^2$ relatively to the bar E after it is adjusted to proper position, I preferably employ a clamping device for connecting the forwardly-extending arms $e\ d^2$ of said bar and frame. In the present example of my invention the end portion of the arm $e$ on the bar is constructed with a segmental slot $e'$, as best shown in Figs. 4 and 7, and through this slot is inserted a clamping-bolt, $e^2$, which enters the arm $d^2$, and by fitting a nut therein serves to clamp the two arms $d^2\ e$ in positive position relatively to each other, and thus hold the frame $D^2$ fixed relatively to the bar E.

Upon the girt $B^3$ is constructed a segmental or arc-shaped slideway or track, H, which, as here shown, is formed with a dovetailed or undercut slot, $h$, and against the flat face of which bears a lateral projection, $e^3$, upon the arm $e$ of the bar E, as best shown in Figs. 2, 3, and 8. This slideway or track H is an arc, the center of which is upon the line $s'$ and eccentric to the pivot $c$ upon which the hanger C swings. The projection $e^3$ of the bar E, bearing against the flat face of the slideway or track H, prevents the bar E from turning in the hanger C, and I also employ a clamping-bolt, $h'$, provided with a nut-handle, $h^2$, whereby the bar E may be clamped to the slideway or track H, and held immovable at any desired angle to which it and the hanger C are swung by the screw $C^2$. The bolt $h'$ is constructed with a segmental or arc-shaped head, $h^3$, of considerable length, as is shown by dotted lines in Figs. 2 and 8, and said head fits the dovetailed or undercut groove $h$ in the cam, and constitutes a slide whereby the bar E is moved endwise and upward in the hanger C as the hanger and bar are swung downward from the position shown in Fig. 2 to the position shown in Fig. 8. The arbor-carrying frame D², being clamped immovably to the bar E, is, by the action of the slideway or track H, moved in the same direction as the bar E, and by these means the saw-arbor D is moved lengthwise and upward, so as to compensate for and counteract the side movement of the saw D' in the slot s, which would otherwise result from the swinging of the hanger C upon the pivot c. The hanger C, pivoted below the table top or table proper, A, as described, and the slideway or track H, struck from a center which is eccentric to the pivot c, therefore constitute means which combine to enable the saw to be angled without any appreciable side movement in its slot s.

The screw F, fitting a nut in the arm C', constitutes a species of gearing, whereby the frame D² may be swung or turned upon the bar E.

By the term "table," as used in the following claims, I mean the table-top or table proper, A, as distinguished from the entire machine, which is commonly known in the trade as a "saw-table."

I am aware that it is not new in a circular-saw table or machine to arrange the arbor-carrying frame to swing downward in a vertical plane parallel with the length of the arbor and with the axis on which it swings at the point of intersection of the plane of the saw with the plane of the table-top, and I therefore do not claim such a construction as of my invention.

What I claim as my invention, and desire to secure by Letters Patent, is—

1. The combination, with a saw arbor and table, of a hanger pivoted to swing in an approximately vertical plane parallel with the saw-arbor, and having its center of motion below the table, and an arbor-carrying frame supported by the hanger, the said frame and table having one relatively to the other a sliding movement in a plane parallel with the saw-arbor as said hanger is swung upon its pivot, whereby the displacement of the saw produced by the swinging movement of the hanger is compensated for, substantially as herein described.

2. The combination, with a saw-arbor and a table, of a hanger pivoted to swing in an approximately vertical plane parallel with the saw-arbor, and having its center of motion below the table, an arbor-carrying frame supported by the hanger, and a slideway or track having its center eccentric to the pivot of the hanger, and by which a sliding movement of the said frame and table one relatively to the other in a plane parallel with the saw-arbor is produced, substantially as and for the purpose herein described.

3. The combination, with a saw arbor and table, of a hanger pivoted to swing in an approximately vertical plane parallel with the saw-arbor, and having its center of motion below the table, an arbor-carrying-frame supported by the hanger and free to slide relatively thereto in a plane parallel with the saw-arbor, a segmental slideway or track having its center eccentric to the pivot of the hanger, and a slide engaging the slideway or track, and through which said frame has such sliding movement imparted to it, substantially as herein described.

4. The combination, with a saw-arbor and a table, of a hanger pivoted to swing in an approximately vertical plane parallel with the arbor, and having its center of motion below the table, a screw for swinging said hanger, an arbor-carrying frame supported by said hanger and free to slide relatively thereto in a plane parallel with the saw-arbor, a segmental slideway or track having its center eccentric to the pivot of the hanger, a slide through which said slidway or track imparts such sliding movement to the frame, and a clamping device for securing said hanger and frame after adjustment, substantially as herein described.

5. The combination, with the saw-arbor D and table A, of the hanger C, pivoted at c below the table, and having the downwardly-projecting arm C' and swiveled nut e³, the screw C², fitting the swiveled nut and mounted in a swiveled bearing, the segmental slideway or track H, an arbor-carrying frame supported by the hanger and free to slide relatively thereto in a plane parallel with the saw-arbor, and a slide and clamping device engaging the slideway or track, and whereby the sliding movement of the said frame and the securing of said frame and hanger after adjustment are effected, substantially as herein described.

6. The combination, with the saw arbor and table and the hanger C, pivoted at c, of a non-rotary bar free to slide in said hanger in a plane parallel with the saw-arbor, an arbor-carrying frame mounted and turnable on the bar, an adjustable clamping device for securing said bar and frame in desired relative position, and a segmental slideway or track, as H, whereby such sliding movement of said bar and frame will be produced, substantially as herein described.

7. The combination, with a saw arbor and table, of a hanger, C, pivoted at c, a non-rotary bar, E, free to slide in said hanger in a plane parallel with the saw-arbor, and having a forwardly-extending arm, e, an arbor-carrying frame turnable on said bar, and having a forwardly-extending arm, d², a clamping device engaging said arms for securing the bar and frame in desired relative position, and a segmental slideway or track, as H, whereby such sliding movement of the bar and frame is produced, substantially as herein described.

8. The combination, with a saw arbor and table, of a hanger, C, pivoted at c to swing in a plane parallel with the saw-arbor, a non-rotary bar, E, free to slide in the hanger, an arbor-carrying frame turnable on said bar and gearing for so turning said frame, a clamping device, whereby said frame is held relatively to the bar after adjustment, and a slideway or track, H, whereby said sliding movement of said bar and frame is produced, substantially as herein described.

9. The combination, with a saw arbor and table, of a hanger pivoted to swing in an approximately vertical plane parallel with the saw-arbor and an arbor-carrying frame supported by said hanger, and having a pivotal connection therewith which permits of swinging said frame in a vertical plane tranverse to the saw-arbor to raise and lower the arbor and saw, substantially as herein described.

EDWARD D. MACKINTOSH.

Witnesses:
C. HALL,
FREDK. HAYNES.